(12) United States Patent
Jung et al.

(10) Patent No.: US 8,094,537 B2
(45) Date of Patent: Jan. 10, 2012

(54) INFORMATION STORAGE MEDIUM AND METHOD OF RECORDING/REPRODUCING THE SAME

(75) Inventors: Kiu-hae Jung, Gyeonggi-do (KR); Jae-Seong Shim, Seoul (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 12/825,316

(22) Filed: Jun. 28, 2010

(65) Prior Publication Data

US 2010/0265805 A1 Oct. 21, 2010

Related U.S. Application Data

(63) Continuation of application No. 11/600,034, filed on Nov. 16, 2006, now Pat. No. 7,746,750, which is a continuation of application No. 10/673,402, filed on Sep. 30, 2003, now Pat. No. 7,724,629.

(30) Foreign Application Priority Data

Dec. 10, 2002 (KR) .................. 2002-78167

(51) Int. Cl.
 *G11B 7/00* (2006.01)
(52) U.S. Cl. .................. 369/59.25; 369/275.3
(58) Field of Classification Search ............... 369/59.25, 369/59.24, 275.3
See application file for complete search history.

(56) References Cited

U.S. PATENT DOCUMENTS

| | | | |
|---|---|---|---|
| 4,142,209 A | 2/1979 | Hedlund et al. | |
| 4,229,808 A | 10/1980 | Hui | |
| 5,132,954 A | 7/1992 | Kulakowski et al. | |
| 5,365,382 A | 11/1994 | Weng et al. | |
| 5,502,699 A | 3/1996 | Yamasaki et al. | |
| 5,513,010 A | 4/1996 | Kori et al. | |
| 5,587,979 A | 12/1996 | Bluthgen | |
| 5,596,564 A | 1/1997 | Fukushima et al. | |
| 5,616,390 A * | 4/1997 | Miyagawa et al. | 428/64.1 |
| 5,715,356 A | 2/1998 | Hirayama et al. | |
| 5,737,287 A | 4/1998 | Lee | |
| 5,793,724 A | 8/1998 | Ichikawa et al. | |

(Continued)

FOREIGN PATENT DOCUMENTS

EP 0 899 734 A2 3/1999

(Continued)

OTHER PUBLICATIONS

K. Schouhamer Immink, "EFMPlus: The Coding Format of the Multimedia Compact Disc," *IEEE Transactions on Consumer Electronics*, vol. 41, No. 3, Aug. 1995, pp. 491-497.

(Continued)

*Primary Examiner* — Wayne Young
*Assistant Examiner* — Thomas D Alunkal
(74) *Attorney, Agent, or Firm* — NSIP Law

(57) ABSTRACT

An information storage medium has user data areas and additional data areas, and sync patterns to distinguish the additional data areas from the user data areas. The information storage medium includes a user data area in which user data is recorded and an additional data area located in at least one of areas before and after the user data area. Second sync patterns used in the additional data area are different from first sync patterns used in the user data area.

8 Claims, 4 Drawing Sheets

U.S. PATENT DOCUMENTS

| | | | |
|---|---|---|---|
| 5,881,037 A | 3/1999 | Tanaka et al. | |
| 5,917,792 A * | 6/1999 | Shigenobu et al. | 369/59.26 |
| 5,987,066 A | 11/1999 | Kojima et al. | |
| 6,005,839 A | 12/1999 | Sako et al. | |
| 6,108,152 A | 8/2000 | Du et al. | |
| 6,118,754 A * | 9/2000 | Sako et al. | 369/275.3 |
| 6,125,156 A | 9/2000 | Watanabe | |
| 6,174,170 B1 | 1/2001 | Olmedo | |
| 6,188,335 B1 | 2/2001 | Roth et al. | |
| 6,191,903 B1 | 2/2001 | Fujimoto et al. | |
| 6,236,631 B1 | 5/2001 | Deguchi et al. | |
| 6,249,896 B1 | 6/2001 | Ho et al. | |
| 6,320,840 B1 | 11/2001 | Oh et al. | |
| 6,339,627 B1 | 1/2002 | Ashizawa | |
| 6,434,091 B1 * | 8/2002 | Kuribayashi | 369/44.13 |
| 6,449,231 B1 * | 9/2002 | Numata | 369/53.2 |
| 6,470,142 B1 | 10/2002 | Isozaki et al. | |
| 6,581,167 B1 | 6/2003 | Gotoh et al. | |
| 6,600,431 B1 | 7/2003 | Shim et al. | |
| 6,600,713 B1 | 7/2003 | Tognazzini | |
| 6,704,262 B2 | 3/2004 | Shishido et al. | |
| 6,788,753 B1 | 9/2004 | Brown | |
| 6,791,777 B2 | 9/2004 | Watanabe et al. | |
| 6,816,447 B1 | 11/2004 | Lee et al. | |
| 6,950,603 B1 | 9/2005 | Isozaki et al. | |
| 6,996,048 B2 | 2/2006 | Senshu | |
| 7,006,760 B1 | 2/2006 | Takagi et al. | |
| 7,065,030 B2 | 6/2006 | Tachino et al. | |
| 7,120,105 B2 | 10/2006 | Okamura et al. | |
| 7,254,316 B2 | 8/2007 | Koshino et al. | |
| 7,266,753 B2 | 9/2007 | Tomita | |
| 7,656,767 B2 | 2/2010 | Jung et al. | |
| 7,701,829 B2 | 4/2010 | Jung et al. | |
| 7,724,629 B2 | 5/2010 | Jung et al. | |
| 7,746,750 B2 | 6/2010 | Jung et al. | |
| 2001/0010604 A1 | 8/2001 | Esumi | |
| 2002/0060968 A1 * | 5/2002 | Senshu | 369/59.25 |
| 2003/0048727 A1 * | 3/2003 | Ando et al. | 369/59.24 |
| 2003/0103429 A1 | 6/2003 | Senshu | |
| 2003/0112725 A1 * | 6/2003 | Kobayashi et al. | 369/47.22 |
| 2003/0174625 A1 | 9/2003 | Okamura et al. | |
| 2003/0179689 A1 * | 9/2003 | Yoon et al. | 369/275.3 |
| 2004/0168010 A1 | 8/2004 | Kim et al. | |

FOREIGN PATENT DOCUMENTS

| | | |
|---|---|---|
| JP | 4-113563 A | 4/1992 |
| JP | 9-162857 A | 6/1997 |
| JP | 11-176081 A | 7/1999 |
| JP | 2002-260341 A | 9/2002 |
| JP | 2002-304821 A | 10/2002 |
| JP | 2004-103096 A | 4/2004 |
| WO | WO 02/052551 A2 | 7/2002 |

OTHER PUBLICATIONS

Mexican Office Action issued on Sep. 21, 2007, in counterpart Mexican Application No. PA/a/2005/005973 (2 pages, in Spanish, no English translation).

Supplementary European Search Report issued on Apr. 18, 2008, in counterpart European Application No. 03774370.5 (3 pages).

Japanese Office Action issued on Jul. 14, 2009, in counterpart Japanese Application No. 2004-558515 (6 pages, in Japanese, with complete English translation).

U.S. Appl. No. 12/019,792, filed Jan. 25, 2008, Kiu-hae Jung et al., Samsung Electronics Co., Ltd.

U.S. Appl. No. 12/019,943, filed Jan. 25, 2008, Kiu-hae Jung et al., Samsung Electronics Co., Ltd.

* cited by examiner

INFORMATION STORAGE MEDIUM AND METHOD OF RECORDING/REPRODUCING THE SAME

CROSS-REFERENCE TO RELATED APPLICATIONS

This application is a continuation of application Ser. No. 11/600,034 filed on Nov. 16, 2006, now U.S. Pat. No. 7,746,750, which is a continuation of application Ser. No. 10/673,402 filed on Sep. 30, 2003, now U.S. Pat. No. 7,724,629, which claims the benefit of Korean Patent Application No. 2002-78167 filed on Dec. 10, 2002, in the Korean Intellectual Property Office, the disclosures of which are incorporated herein by reference in their entirety.

BACKGROUND OF THE INVENTION

1. Field of the Invention

The present invention relates to an information storage medium having user data areas and additional data areas and a method of reproducing information recorded on the information storage medium, and more particularly, to an information storage medium having an improved structure in which user data areas are distinguished from additional data areas and a method of recording information thereon and/or reproducing information from the information storage medium.

2. Description of the Related Art

Optical discs are generally used as information storage media of optical pickup devices which record information on and/or reproduce information from the optical discs without contacting the optical discs. Optical discs are classified as either compact discs (CDs) or digital versatile discs (DVDs) according to their information recording capacity. Optical discs can also be classified as either recordable discs or read-only discs according to their recording potential. Here, the recordable discs include 650 MB CD-Rs, CD-RWs, 4.7 GB DVD+R/RWs, DVD-random access memories (DVD-RAMS), DVD-R/RWs, and so forth. The read-only discs include 650 MB CDs, 4.7 GB DVD-ROMs, and the like.

FIG. 1 illustrates the data structure of a recordable information storage medium such as a CD-R or a CD-RW. Referring to FIG. 1, the recordable information storage medium includes user data areas A and additional data areas B located before and after the user data areas A. Here, the user data areas A are physical clusters in which data is recorded. The additional data areas B are divided into run-in areas and run-out areas.

The additional data areas B serve as spare areas in which data can be recorded even when a recording position of the information storage medium is changed with a variation in the speed of a spindle motor during rotating of the information storage medium on a turntable.

In a case where a read-only information storage medium is manufactured according to the above-described format, the read-only information storage medium is required to have the same structure as the recordable information storage medium so as to have reproduction compatibility in a drive and a format consistent with the recordable information storage medium. In other words, the read-only information storage medium has a structure including user data areas A and additional data areas B. Here, the additional data areas B are located before and after the user data areas A and must have the same length as the run-in areas and the run-out areas described with reference to FIG. 1. In this case, the additional data areas B have to be separated from the user data areas A.

SUMMARY OF THE INVENTION

Additional aspects and advantages of the invention will be set forth in part in the description which follows and, in part, will be obvious from the description, or may be learned by practice of the invention.

The present invention provides an information storage medium having user data areas and additional data areas, and sync patterns to distinguish the additional data areas from the user data areas, and a method of recording information on and/or reproducing information from the same.

According to an aspect of the present invention, an information storage medium includes a user data area in which user data is recorded and an additional data area located in at least one of areas before and after the user data area, where second sync patterns used in the additional data area are different from first sync patterns used in the user data area.

According to another aspect of the present invention, a method of recording information on and/or reproducing information from an information storage medium includes preparing user data area in which user data is recorded and an additional data area located in at least one of areas before and after the user data area, where second sync patterns used in the additional data area are formed differently from first sync patterns used in the user data area.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE EMBODIMENTS

Figure 1:
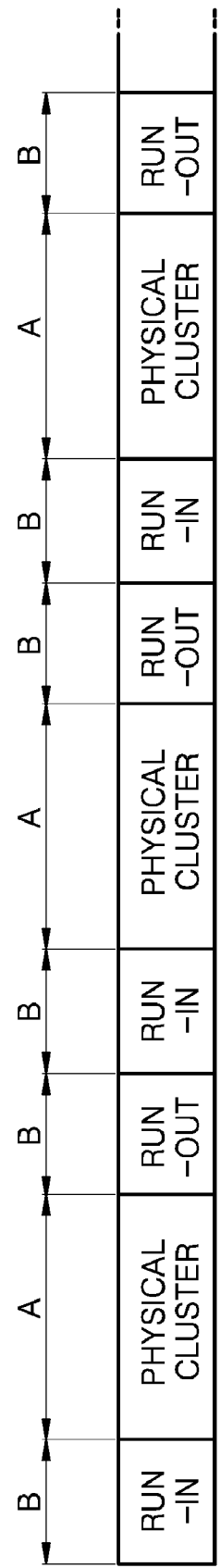
FIG. 1 illustrates the data structure of a conventional recordable information storage medium such as a CD-R or a CD-RW.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
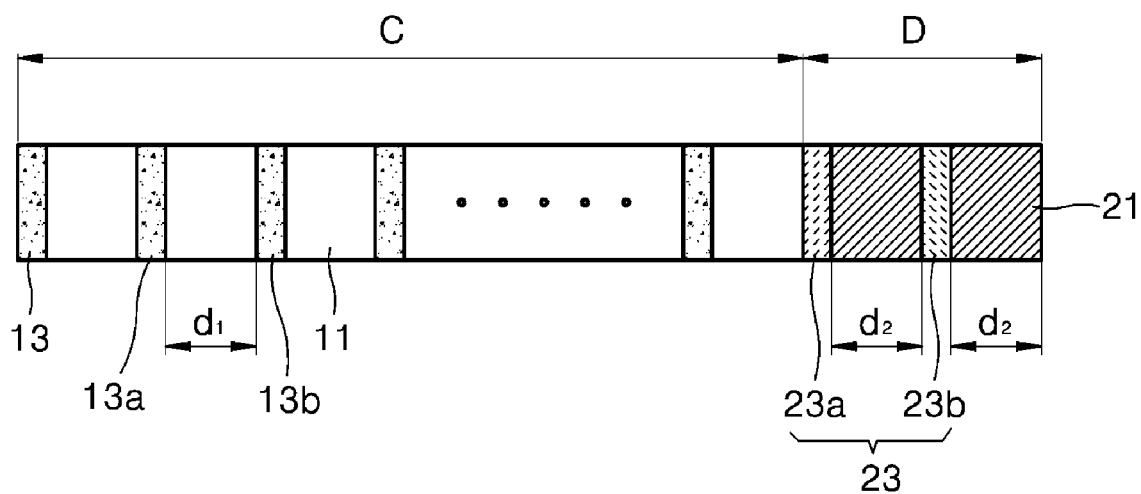
FIG. 2 illustrates the data structure of a recording unit of an information storage medium according to an embodiment of the present invention.
Figure 3:
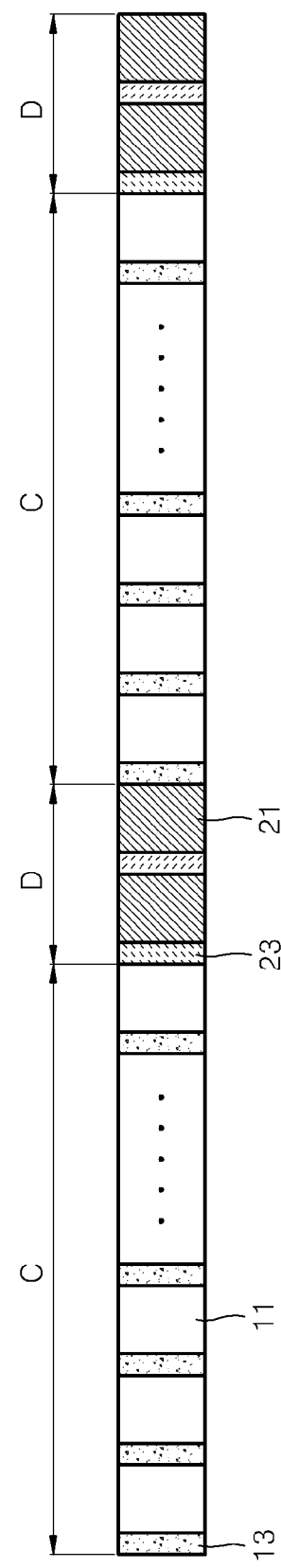
FIG. 3 illustrates the data structure of the information storage medium.

Referring to FIGS. 2 and 3, an information storage medium according to an embodiment of the present invention includes user data areas C in which user data is recorded and additional data areas D located before and/or after the user data areas C. The information storage medium may be a recordable information storage medium or a read-only information storage medium.

Each of the user data areas C contains a plurality of user data 11 separated by a plurality of first sync patterns 13. According to an aspect of the invention, the user data areas C include error correcting code (ECC) recording units.

Each of the additional data areas D contains a plurality of additional data 21 separated by a plurality of second sync patterns 23. Here, as will be explained later, the first sync patterns 13 have modulation codes corresponding to sync numbers shown in Tables 1 and 2 and are formed by combining predetermined selected sync numbers. The second sync patterns 23 are formed of predetermined types of patterns denoted by reference numerals 23a and 23b according to the same method as the plurality of first sync patterns 13.

According to an aspect of the invention, the second sync patterns 23 are different from the first sync patterns 13. In other words, the second sync patterns 23 are formed of patterns which are not used as the first sync patterns 13. By forming the second sync patterns 23 to be different from the first sync patterns 13, a reproducing system such as that shown in FIG. 4 can manage the additional data areas D by being able to differentiate the additional data areas D, with certainty, from the user data areas C.

The number of second sync patterns 23 depends on the length of the additional data areas D. It is preferable, but not required, that the second sync patterns 23 are arranged at equal intervals in order to increase an effective additional data efficiency of the additional data areas D. In addition, sync data can be easily restored during reproducing.

While not required, according to an aspect of the invention, the size of each of the plurality of user data 11 in the user data areas C is equal to a size of each of the plurality of additional data 21 in the additional data areas D. This structure can be realized by adjusting the positions of the second sync patterns 23.

It is preferable, but not required, that the entire size of additional data 21 in the additional data areas D be integer multiples of the size d1 of user data 11 recorded between two adjacent first sync patterns 13a and 13b. In other words, referring to FIG. 2, the size d2 of additional data 21 recorded between two adjacent second sync patterns 23a and 23b is equal to the size d1 of the user data 11 recorded between first sync patterns 13a, 13b, and the additional data 21 are recorded in two parts of each of the additional data areas D. Thus, the total size of the additional data 21 is an integer multiple of (i.e., is twice the size of) the size d1 of the user data 11. As a result, since sync signals are detected at regular intervals in all areas during reproducing of data, it is advantageous to restore the sync signals.

The structure of the information storage medium using a run-length-limited (RLL) (d, k) code will be described below. The RLL code indicates how many bits of value "0" exist between two bits of value "1". Thus, the RLL (d, k) code represents that the minimum number d and the maximum number k of bits of value "0" between two bits of value "1", respectively.

In the structure using the RLL (d, k) code, the first sync patterns 13 generally include sync bodies that do not satisfy the RLL (d, k) code and sync identifications (IDs) that satisfy the RLL (d, k) code. In other words, the sync bodies have a run length k+i, where i is an integer that is greater than or equal to "1". The sync IDs contain different patterns to distinguish N different sync patterns.

The second sync patterns 23 include sync bodies that do not satisfy the RLL (d, k) code and sync IDs that satisfy the RLL (d, k) code. The sync IDs contain different patterns to distinguish N different sync patterns.

FIG. 3 illustrates an embodiment of the data structure of an information storage medium including additional data areas D each having two additional data frames. Sync bodies and sync IDs of the information storage medium having the above data structure are shown in Tables 1 and 2 below.

As can be seen in Table 1, a RLL (1,7) code is used. Each sync body has 18 bits, and each sync ID has 6 bits. The user data area C includes 9 user data frames having corresponding sync data, and the additional data area D includes two additional data frames having corresponding sync data.

TABLE 1

| Sync No. | 18-Bit Sync Body | 6-Bit Sync ID | Remark |
|---|---|---|---|
| 0 | 001 001 010 000 000 010 | 000 0001 | User Data Area |
| 1 | 001 001 010 000 000 010 | 010 010 | Sync Data |
| 2 | 001 001 010 000 000 010 | 101 000 | |
| 3 | 001 001 010 000 000 010 | 100 001 | |
| 4 | 001 001 010 000 000 010 | 000 100 | |
| 5 | 001 001 010 000 000 010 | 001 001 | |
| 6 | 001 001 010 000 000 010 | 010 101 | |
| 7 | 001 001 010 000 000 010 | 010 000 | |
| 8 | 001 001 010 000 000 010 | 101 010 | |
| 9 | 001 001 010 000 000 010 | 100 101 | Additional Data |
| 10 | 001 001 010 000 000 010 | 101 001 | Area Sync Data |

As can be seen in Table 2, a RLL (2,10) code is used. Each sync body has 22 bits, and each sync ID has 10 bits. The user data area C includes 7 user data frames having corresponding sync data, and the additional data area D includes 2 additional data frames having corresponding sync data.

TABLE 2

| Sync No. | 22-Bit Sync Body | 10-Bit Sync ID | Remark |
|---|---|---|---|
| 0 | 100 001 000 000 000 000 010 0 | 010 001 000 1 | User Data Area |
| 1 | 100 001 000 000 000 000 010 0 | 000 100 100 1 | Sync Data |
| 2 | 100 001 000 000 000 000 010 0 | 010 000 010 0 | |
| 3 | 100 001 000 000 000 000 010 0 | 001 000 000 0 | |
| 4 | 100 001 000 000 000 000 010 0 | 100 100 100 0 | |
| 5 | 100 001 000 000 000 000 010 0 | 010 000 100 0 | |
| 6 | 100 001 000 000 000 000 010 0 | 000 010 000 0 | |
| 7 | 100 001 000 000 000 000 010 0 | 001 001 000 1 | Additional |
| 8 | 100 001 000 000 000 000 010 0 | 010 010 010 0 | Data Area Sync Data |

As shown in Tables 1 and 2, the sync data in the additional data D area have different patterns as compared to the sync data in the user data area C. In other words, the sync IDs of the second sync patterns 23 have sync patterns not used as the first sync patterns 13. Therefore, the additional data areas D can be managed and can be distinctly differentiated from the user data areas C.

A method of recording information on and/or reproducing information from the information storage medium having the above-described structure will be described. As shown in FIG. 2, the user data areas C including basic ECC recording blocks and the additional data areas D located before and/or after the user data areas C are prepared in the information storage medium. Next, the second sync patterns 23 used in the additional data areas D are formed differently from the first sync patterns 13 used in the user data areas C.

Here, the second sync patterns 23 are plural and arranged at equal intervals. It is preferable, but not required, that the second sync patterns 23 are arranged in the additional data areas D so that the size of each of user data 11 in the user data areas C is equal to the size of each of additional data 21 in the additional data areas D.

Sync data in the additional data areas D contains sync bodies having second sync patterns that do not comply with the RLL (d, k) code and sync IDs having second sync patterns that comply with the RLL (d, k) code. The total size of additional data 21 in the additional data areas D is an integer multiple of the size of user data 11 recorded between two first sync patterns 13*a* and 13*b*.

As described above, an information storage medium and a method of recording information thereon and/or reproducing information therefrom according to the present invention can maintain consistency with the formats of different types of recordable information storage media and have reproduction compatibility in a drive.

Also, since sync patterns used in user data areas can be formed differently from sync patterns used in additional data areas, the additional data areas can be further efficiently separated from the user data areas.

Furthermore, by uniformly maintaining the length of data recorded in the user data areas and the additional data areas, sync signals can be detected at regular intervals in all areas during reproducing of data. Thus, it is advantageous to restore the sync signals.

While not specifically so limited, it is understood that the information storage medium can include the CD-Rs, CD-RWs, DVD-RWs, DVD-RAMs, DVD+RWs, as well as next generation high definition DVDs, such as Blu-ray discs, Advanced Optical Discs (AODs) and other optical storage media not listed above and/or to be developed.

Figure 4:
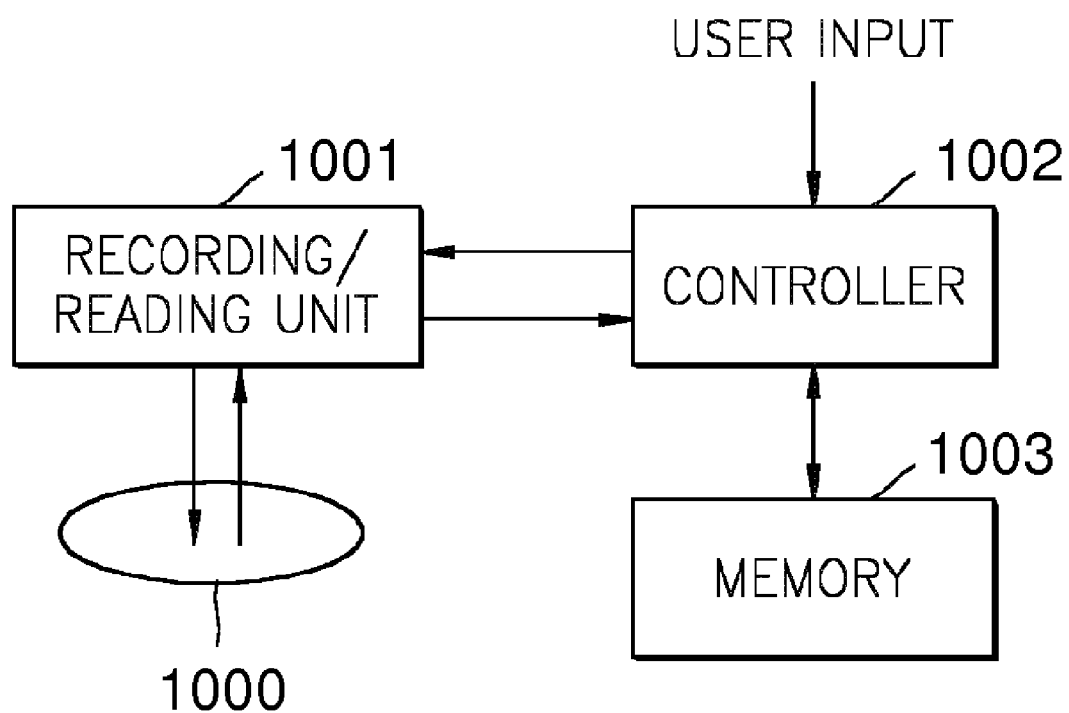
FIG. 4 is a block diagram of a recording and/or reproducing apparatus according to an embodiment of the present invention.

FIG. 4 is a block diagram of a recording and/or reproducing apparatus according to an embodiment of the present invention. Referring to FIG. 4, the recording and/or reproducing apparatus includes a recording/reading unit 1001, a controller 1002, and a memory 1003. The recording/reading unit 1001 records data on a disc 1000, which is an embodiment of an information storage medium of the present invention, and reads the data from the disc 1000. The controller 1002 records and reproduces the user data 11 and the additional data 21 according to the present invention as set forth above in relation to FIGS. 2 and 3.

While not required in all aspects, it is understood that the controller 1002 can be a computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AODs).

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A read-only information storage medium for use with a reproducing apparatus, the read-only information storage medium comprising:
    a plurality of data areas each comprising a plurality of data frames, each of the data frames comprising corresponding sync data of a plurality of sync data for the plurality of data frames; and
    an additional data area located between two of the data areas and comprising:
        a first additional data frame comprising first sync data; and
        a second additional data frame comprising second sync data;
    wherein the first sync data is different from the second sync data;
    the first sync data is different from each of the plurality of sync data of the data frames;
    the second sync data is different from each of the plurality of sync data of the data frames;
    the first sync data and the second sync data enable the apparatus to identify the additional data area from the data areas when the read-only information storage medium is used with the apparatus;
    a size of the first additional data frame is identical to a size of the second additional data frame; and
    a size and a location of the additional data area are selected to provide consistency with a recordable information storage medium having a format that is different from a format of the read-only information storage medium.

2. The read-only information storage medium of claim 1, wherein a size of the additional data area is an integer multiple of a size of one of the data frames.

3. The read-only information storage medium of claim 1, wherein a size of the first additional data frame is equal to a size of one of the data frames.

4. The read-only information storage medium of claim 1, wherein the first sync data, the second sync data, and the plurality of sync data of the data frames enable the apparatus to identify the additional data area from the data areas when the read-only information storage medium is used with the apparatus without detecting any combination of any of the first sync data, the second sync data, and the plurality of sync data of the data frames.

5. A reproducing apparatus usable with a read-only information storage medium, the read-only information storage medium comprising a plurality of data areas each comprising a plurality of data frames, each of the data frames comprising corresponding sync data of a plurality of sync data for the plurality of data frames; and an additional data area located between two of the data areas and comprising a first additional data frame comprising first sync data, and a second additional data frame comprising second sync data; the reproducing apparatus comprising:
    a pickup configured to emit light onto the read-only information storage medium; and
    a controller configured to:
        control the pickup to reproduce the first sync data and the second sync data from the read-only information storage medium, the first sync data being different from the second sync data, the first sync data being different from each of the plurality of sync data of the data frames, and the second sync data being different from each of the plurality of sync data of the data frames; and
        identify the additional data area from the data areas based on the first sync data and the second sync data;
    wherein a size of the first additional data frame is identical to a size of the second additional data frame; and
    a size and a location of the additional data area are selected to provide consistency with a recordable information storage medium having a format that is different from a format of the read-only information storage medium.

6. The reproducing apparatus of claim 5, wherein a size of the additional data area is an integer multiple of a size of one of the data frames.

7. The reproducing apparatus of claim 5, wherein a size of the first additional data frame is equal to a size of one of the data frames.

8. The reproducing apparatus of claim 5, wherein the controller is further configured to identify the additional data area from the data areas based on the first sync data and the second sync data without detecting any combination of any of the first sync data, the second sync data, and the plurality of sync data of the data frames.

* * * * *